United States Patent [19]

Mondragon

[11] 4,404,959
[45] Sep. 20, 1983

[54] SOLAR HEATING SYSTEM

[76] Inventor: Ralph Mondragon, P.O. Box 199, Ranches of Taos, N. Mex. 87557

[21] Appl. No.: 345,167

[22] Filed: Feb. 2, 1982

[51] Int. Cl.³ .............................................. F24J 3/02
[52] U.S. Cl. .................................... 126/429; 126/430; 126/436
[58] Field of Search ............... 126/429, 430, 436, 431, 126/400, 450

[56] References Cited

U.S. PATENT DOCUMENTS

| 2,601,905 | 7/1952 | Anderegg | 126/429 |
| 2,680,565 | 6/1954 | Lof | 126/429 |
| 4,061,129 | 12/1977 | Wilson | 126/430 |
| 4,068,652 | 1/1978 | Worthington | 126/430 |
| 4,084,573 | 4/1978 | Shubert | 126/429 |
| 4,193,390 | 3/1980 | Hatten | 126/429 |
| 4,197,993 | 4/1980 | Trombe | 126/429 |
| 4,201,188 | 5/1980 | Cummings | 126/429 |
| 4,215,673 | 8/1980 | Cohen | 126/429 |
| 4,227,515 | 10/1980 | Jacob et al. | 126/429 |
| 4,246,888 | 1/1981 | Jarzenbeck | 126/429 |

Primary Examiner—Daniel J. O'Connor
Attorney, Agent, or Firm—James A. Wong

[57] ABSTRACT

A solar heating system comprising a heat collecting-storage chamber at the upper level of a building; a solar heat collecting apparatus disposed and extending laterally within the chamber; a hot air supply and return plenum including a generally vertically extending central air supply duct and a plurality of generally vertically extending return air passages surrounding the supply duct; heat storage and yielding members disposed in the chamber and surrounding the hot air supply and return plenum; and mechanism effecting circulation of air through the system by drawing hot air from the chamber through the supply duct and by returning relatively cooler air to the chamber through the return air passages; wherein the heat collecting-storage chamber includes windows and a floor enclosing the chamber; the windows being above the heat collecting apparatus to enable impingement of the sun's rays upon the heat collecting apparatus; the floor supporting the heat storage and yielding members within the chamber; and the hot air supply plenum, including the supply duct and return air passages, extends down through the floor of the chamber to lower levels of a building in which the solar heating system may be installed.

10 Claims, 6 Drawing Figures

FIG. 2.
FIG. 6.
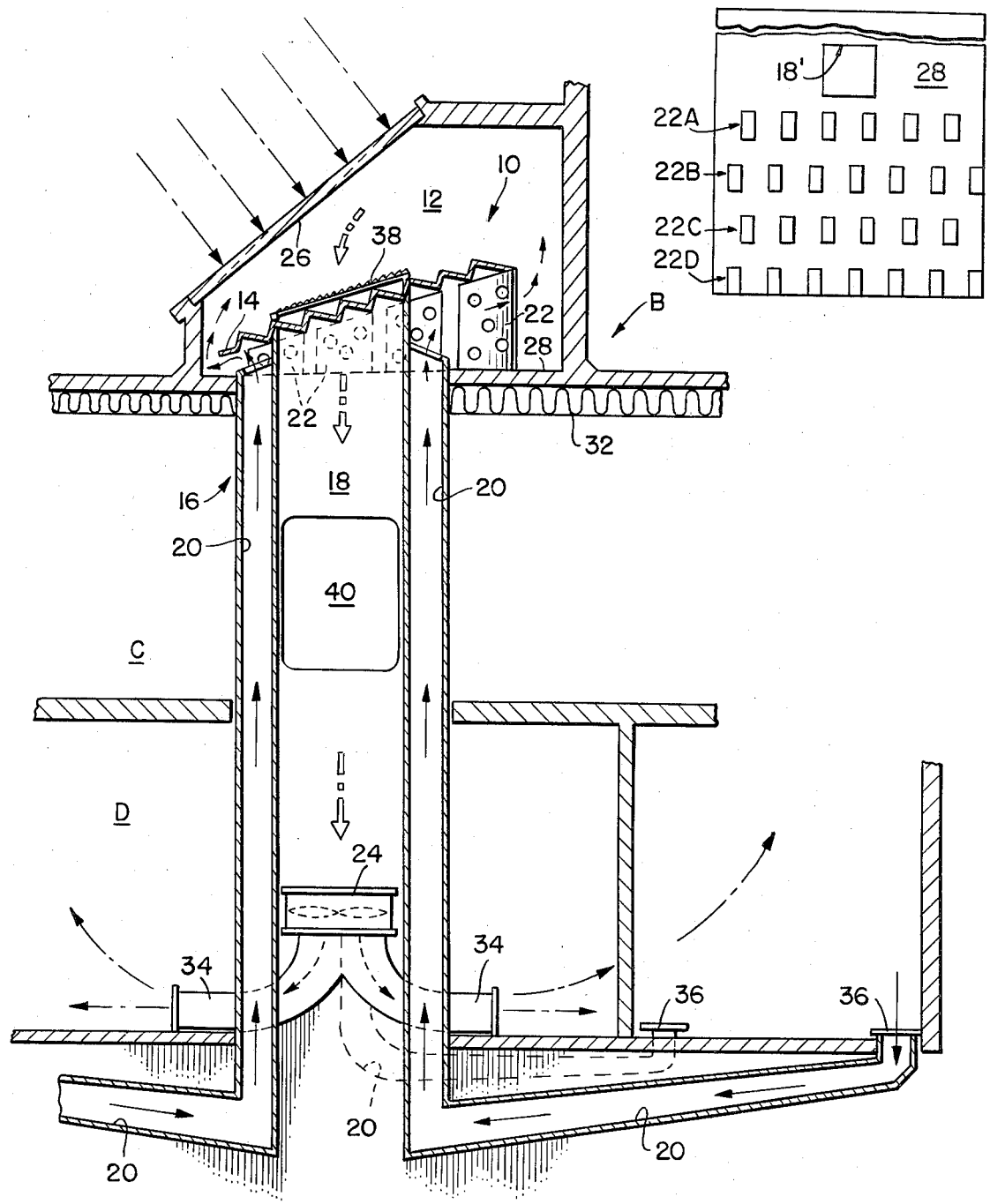
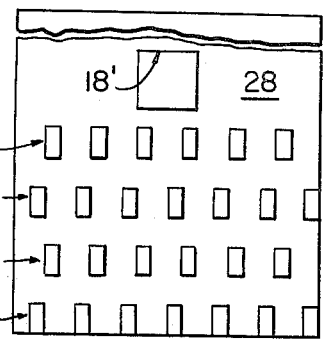

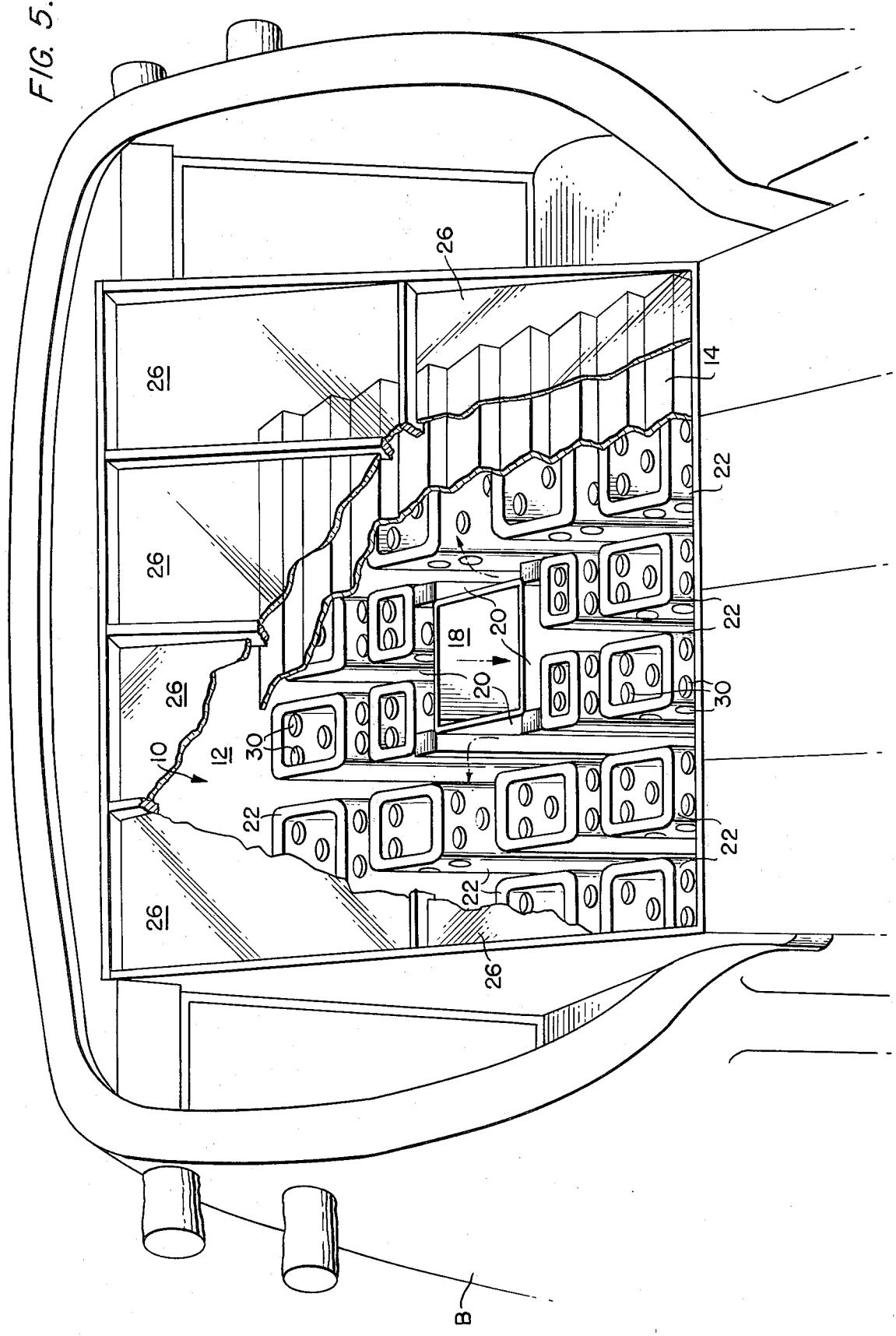

SOLAR HEATING SYSTEM

BACKGROUND OF THE INVENTION

The invention disclosed and claimed herein has been conceived and developed as a result of the general public knowledge of the increasing scarcity of energy resources, in particular, fossil fuels. The disclosed invention relates to a functional solar heating system which has been conceived by applicant to efficaciously recover energy from a continuously discharging source, namely, the sun, and to convert such energy to the useful purpose of heating a building structure, such as a home or the like.

OBJECTS OF THE INVENTION

Consistent with the summary of the invention set forth above, it is an object of the present invention to provide a new and improved heating system which will reduce one's consumption of the world's ever dwindling supply of fossil fuels.

It is another object of this invention to provide a new and improved system for harnessing energy transmitted by the sun to earth and converting such energy to furnish human comfort.

It is a further object of this invention to provide a new and improved system whereby solar energy may be captured for use and/or for storage and use when needed.

It is yet a further object of this invention to provide a new and improved heating system comprising solar heating features with a back-up or auxiliary heating system.

BRIEF DESCRIPTION OF THE DRAWINGS

The objects enumerated above as well as various advantages or benefits of the present invention will be readily appreciated by the reader upon referring to the appended drawings in which:

FIG. 2 is an enlarged sectional view taken along the plane 2—2, looking in the direction of the arrows in FIG. 1;

FIG. 5 is a view in perspective of the heat collecting-storage chamber with portions broken away to more clearly expose various details therein; and FIG. 6 is a plan view schematic representation of an alternative arrangement of components of the disclosed invention.

DETAILED DESCRIPTION OF THE INVENTION

Figure 1:
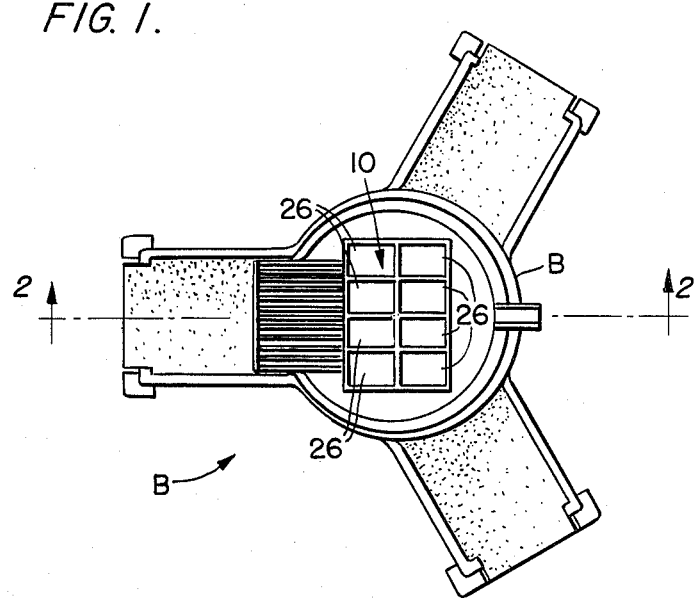
FIG. 1 is a plan view of the solar heating system according to applicant's invention installed in a building.

Referring now to the drawings in detail, the reader will readily appreciate that the disclosed solar heating system 10, which is incorporated in a building B of the type illustrated in my copending design patent application Ser. No. 174,048, filed July 31, 1980, comprises a heat collecting and storage chamber 12 located at the upper level of a building B; solar heat collecting means, in the form of a black sheet metal member 14 with steps as seen from one side thereof, disposed within chamber 12; a hot air supply and return plenum 16 including a generally vertically extending central air supply duct 18 and a plurality of generally vertically extending return air passages 20 surrounding supply duct 18; heat storage and yielding means, in the form of adobe, clay or like members 22, disposed in chamber 12 just below the sheet member 14, and surrounding hot air supply and return plenum 16; and means, such as a fan 24, effecting circulation of air through the system 10 by drawing hot air from chamber 12 through supply duct 18 and by returning relatively cooler air to chamber 12 through return air passages 20. The disclosed heat collecting and storage chamber 12 is closed to the outside by windows 26 and includes a floor 28 enclosing chamber 12. The windows 26 are disposed above heat collecting sheet 14 to allow passage of the sun's rays to enable impingement thereof upon heat collecting sheet 14. Floor 28 supports heat storage and yielding members 22 within chamber 12. Hot air supply plenum 16, as may be seen in FIGS. 2 and 5, includes supply duct 18 and return air passages 20, which extend down through floor 28 of chamber 12 to lower levels of a building B in which solar heating system 10 is shown to be installed.

Figure 3:
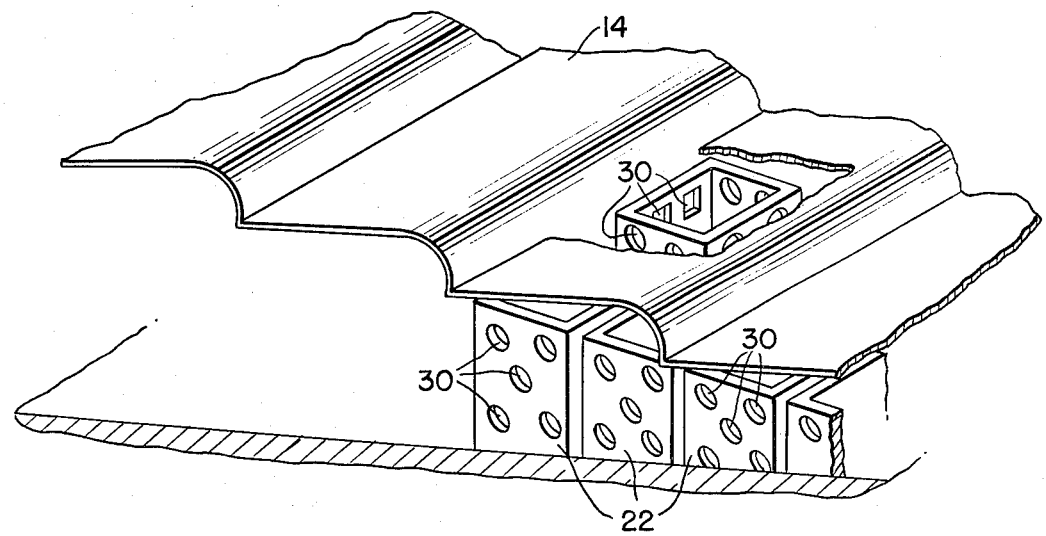
FIG. 3 is a fragmentary view in perspective of the heat collector and heat storage members on a scale enlarged further beyond that of FIG. 2.

As may be seen in FIGS. 3 and 5, the heat storage and yielding members 22, which are preferably of adobe or clay material, are sleeve or tubular in shape with sides or walls formed with a plurality of apertures 30 enabling passage of air through and around members 22 to provide effective heat distribution. While adobe or clay are the preferable material for members 22, any other material having good heat absorbing, storing, and yielding characteristics may be used in place thereof depending upon comparative availability and cost of the necessary materials. Apertures 30 may be circular, square, or of any other configuration.

Preferably, the solar heat collecting means disclosed herein is in the form of a black sheet metal member formed with steps as seen from one side and illustrated in FIGS. 2–5. Any other form of collector member may be used, provided that it be disposed above the heat storage and yielding members 22 in the manner shown in FIG. 2.

Figure 4:
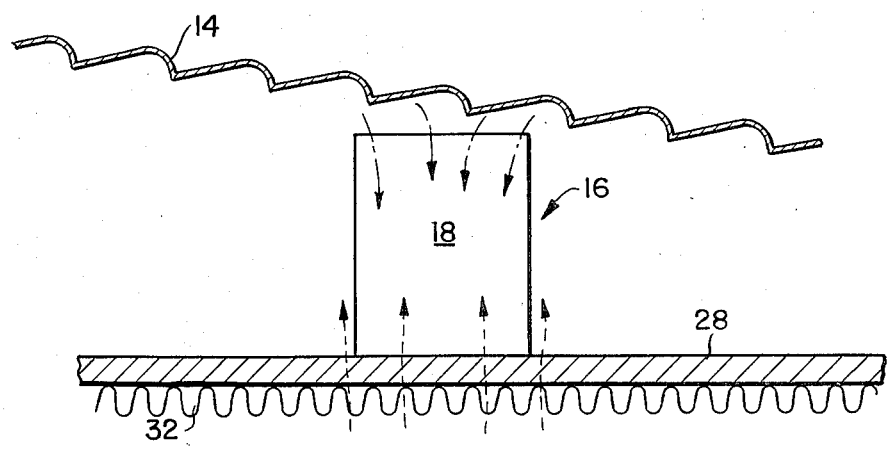
FIG. 4 is a schematic side elevational view of the direction of air current flow with respect to the top of ducting for the disclosed heating system.

As may be seen in FIGS. 2 and 4, heat insulation material 32 is provided on one side of floor 28 so that undesired dissipation of heat from heat collecting and storage chamber 12 will not occur. While not shown, insulation may also be provided along the side walls of chamber 12.

To effect distribution of heat through the system 10, air outlet or distribution ducts 34 in communication with supply duct 18 are provided through which warm air is drawn by fan 24, which may be of the suction type. Heated air flow is indicated in FIG. 2 by the large arrows as being downwardly through supply duct 18 and by the smaller arrows as being outwardly from distribution ducts into occupied space at various levels. Cool or used air is taken in by return registers 36, through return ducts and/or passages 20, and through and around heat storage and yielding members 22 as indicated by the inwardly and upwardly directed arrows. Also, as seen in FIG. 2, return ducts 20 includes vertically and laterally extending portions.

Operation of the disclosed heating includes and is augmented by focusing means in the form of a plurality of lens, formed in a glass sheet 38, for example, disposed above the heat collecting sheet member 14. As a back-up for the disclosed solar heating system 10, an auxiliary heater 40, which may be of the gas, electric, or any other suitable type, is provided in warm air supply duct 18 upstream from fan 24.

As may be seen in FIG. 2, the building B may include at least two levels C and D of occupancy. Although air outlet or distribution ducts 34 are visible only at level D in FIG. 2, ducts are to be understood to be behind and/or in front of heater 40. Also, as seen in FIG. 2, return passages 20, 20 include generally vertically and laterally portions. The generally vertically extending portions of return passages 20, 20 terminate at upper ends located close to the floor 28 in chamber 12 so that air returned thereto will immediately be passed into contact, around, and/or through heat storage and yielding members 22 and expeditiously warmed thereby.

Fan 24 may be operated by manual and/or thermostatic control switches independently of auxiliary heater 40. Auxiliary heater 40, however, under the ordinary circumstances will be operated together with fan 24, also by manual and/or thermostatic control switches.

From the foregoing description, the reader should readily understand that heat from the sun's rays impinging upon collector sheet 14 during the day, particularly as focused and concentrated thereon by lens 38, will heat the air in chamber 12 so that such heat will in turn be absorbed and stored by tubular or sleeve members 22 which are of adobe, clay, or like heat absorbing material, until such time as heat is needed at levels C and/or D. When fan 24 is turned on because of heat requirements at level C or D, air in chamber 12 is caused to circulate around tubular or sleeve members 22, through apertures 30, at which time members 22 will yield heat stored thereby to the circulating air. The heated air will then be drawn downwardly through air supply duct 35 and distributed by ducts 34 to heat levels C and D. Used air from levels C and D is drawn in registers 36 and returned to chamber 12 by way of return air passages 20.

The windows 26 are located so as to provide the disclosed heating system 10 with a southern exposure to the sun. An alternative embodiment of my heating system as described above is illustrated in FIG. 6 in which a plurality of rows 22A, 22B, 22C, and 22D of sleeve or tubular members are schematically shown to be extending along one side of hot air supply duct 18'. Each sleeve or tubular member in the various rows 22A, 22B, 22C, and 22D are arranged so as to be in a line with another sleeve or tubular member in an alternate row and not in a line with an adjacent sleeve or tubular member of the adjacent row. Windows 26 which are not shown in FIG. 6 are to be understood situated above the rows 22A, 22B, 22C, and 22D of sleeve or tubular members with the lower edges of the lower windows being south of the sleeve or tubular members. The heat storage and yielding members in rows 22A, 22B, 22C, and 22D, for example, may be made of adobe blocks weighing about ten pounds and having outside dimensions of 1'×2'. The tubular members in FIG. 6 may be arranged so as to be spaced apart from each other at about one foot intervals.

It will be obvious to those skilled in the art that various changes may be made without departing from the scope of the invention and the invention is not to be considered limited to what is shown in the drawings and described in the specification.

What is claimed is:

1. A solar heating system comprising:

a. a heat collecting and storage chamber located at the upper level of a building;
   b. solar heat collecting means disposed and extending laterally within said chamber;
   c. a hot air supply and return plenum including a generally vertically extending central air supply duct and a plurality of generally vertically extending return air passages surrounding said supply ducts;
   d. heat storage and yielding means disposed in said chamber and adjacent said hot air supply and return plenum; and
   e. means effecting circulation of air through said system by drawing hot air from said chamber through said supply duct and by returning relatively cooler air to said chamber through said return air passages;
   wherein said heat collecting and storage chamber includes windows and a floor enclosing said chamber; said windows are disposed above said heat collecting means to enable impingement of the sun's rays upon said heat collecting means; said floor supports said heat storage and yielding means within said chamber; and said hot air supply plenum, including said supply duct and said return air passages, extends down through said floor of said chamber to lower levels of a building in which said solar heating system may be installed.

2. The solar heating system as defined in claim 1, wherein said heat storage and yielding means comprises a plurality of hollow sleeve or tubular members formed from adobe, clay, or like material having good heat absorbing, storing, and yielding characteristics.

3. The solar heating system as defined in claim 2, wherein each of said sleeve or tubular members includes sides or walls formed with a plurality of apertures enabling passage of air therethrough and effective heat distribution.

4. The solar heating system as defined in any one of claims 1, 2, or 3, wherein said solar heat collecting means comprises a black sheet metal member formed with steps as seen from one side thereof.

5. The solar heating system as defined in claim 3, wherein said means effecting circulation of air through said system comprises a suction fan within said air supply duct.

6. The solar heating system as defined in claim 3, wherein said floor of said chamber is separated from the level therebelow by a layer of heat insulation material.

7. The solar heating system as defined in claim 3, wherein focusing means in the form of a plurality of lens formed in a glass sheet, for example, is disposed above said heat collecting means.

8. The solar heating system as defined in claim 5, including means operable as a back-up heating system disposed within said supply air duct upstream of said fan.

9. The solar heating system as defined in claim 3, wherein said sleeve or tubular members are in a plurality of rows extending along one side of said hot air supply and return plenum and beneath said windows and each of said sleeve or tubular member of said rows is in a line with another of said sleeve or tubular member in an alternate one of said rows and not in a line with an adjacent one of said sleeve or tubular member of the adjacent one of said rows.

10. The solar heating system as defined in claim 3, wherein said sleeve or tubular members are in an arrangement surrounding said hot air supply and return plenum and below said windows.

* * * * *